(12) United States Patent
Koch et al.

(10) Patent No.: US 9,067,269 B2
(45) Date of Patent: Jun. 30, 2015

(54) HORIZONTAL GEAR SHAPING MACHINE WITH DUAL SHAPING HEADS

(75) Inventors: Loyd L. Koch, Rockford, IL (US); Hans Grass, Rockford, IL (US); Wayne Densmore, Hendersonville, NC (US)

(73) Assignee: Bourn & Koch, Inc., Rockford, IL (US)

( * ) Notice: Subject to any disclaimer, the term of this patent is extended or adjusted under 35 U.S.C. 154(b) by 855 days.

(21) Appl. No.: 13/272,710

(22) Filed: Oct. 13, 2011

(65) Prior Publication Data

US 2013/0094917 A1    Apr. 18, 2013

(51) Int. Cl.
    *B23F 5/16* (2006.01)
    *B23Q 1/01* (2006.01)
    *B23Q 39/02* (2006.01)
    *B23F 23/00* (2006.01)

(52) U.S. Cl.
    CPC ........... *B23F 5/16* (2013.01); *Y10T 409/10636* (2015.01); *Y10T 409/101431* (2015.01); *B23Q 1/017* (2013.01); *B23Q 39/023* (2013.01); *B23F 23/006* (2013.01); *B23F 5/166* (2013.01)

(58) Field of Classification Search
    CPC ................ B23F 1/04; B23F 5/12; B23F 5/16; B23F 5/163; B23F 5/166; B23F 5/18; B23F 19/066
    USPC .................. 409/31, 33, 34, 37, 39–41, 55, 56
    See application file for complete search history.

(56) References Cited

U.S. PATENT DOCUMENTS

| | | | |
|---|---|---|---|
| 2,245,654 A * | 6/1941 | Drader et al. | 451/47 |
| 2,556,142 A * | 6/1951 | McLeod | 409/33 |
| 2,749,802 A * | 6/1956 | Carlsen | 409/33 |
| 3,007,374 A * | 11/1961 | Nitschke | 409/62 |
| 3,628,359 A | 12/1971 | Tlaker | |
| 3,741,659 A | 6/1973 | Jones, Jr. | |
| 3,806,691 A | 4/1974 | Roach | |
| 4,125,056 A | 11/1978 | Tlaker et al. | |
| 4,136,302 A | 1/1979 | Tlaker et al. | |
| 4,167,218 A | 9/1979 | Horiuchi et al. | |
| 4,254,690 A | 3/1981 | Tlaker et al. | |
| 4,533,858 A | 8/1985 | Tlaker | |

(Continued)

FOREIGN PATENT DOCUMENTS

| | | | | |
|---|---|---|---|---|
| JP | 60-090625 A | * | 5/1985 | ............... B23F 5/16 |
| JP | 09-117825 A | | 5/1997 | |

(Continued)

*Primary Examiner* — Sunil K Singh
*Assistant Examiner* — Ryan Rufo
(74) *Attorney, Agent, or Firm* — Reinhart Boerner Van Deuren P.C.

(57) ABSTRACT

A gear shaping machine is provided. The gear shaping machine includes a pair of horizontally reciprocating gear shaping heads mounted to a column. Each gear shaping head includes a spindle assembly including an integral rotary drive for indexing the spindle. The spindle assembly is carried by a spindle slide. The spindle slide also carries a plurality of bearing blocks to allow for sliding movement of the gear shaping head relative to rails mounted on the column. A linear drive arrangement is operably coupled between each gear shaping head and the column. The linear guide arrangement allows for controlled linear translation of each gear shaping head independently of one another. Each gear shaping head also includes a back-off mechanism for independently moving the spindle assembly toward the workpiece during a cutting stroke and away from the workpiece during a return stroke of each gear shaping head.

11 Claims, 11 Drawing Sheets

(56) References Cited

U.S. PATENT DOCUMENTS

| | | | |
|---|---|---|---|
| 4,542,638 A | 9/1985 | Tlaker | |
| 4,565,474 A * | 1/1986 | Charles | 409/51 |
| 4,629,377 A | 12/1986 | Tlaker et al. | |
| 4,784,538 A | 11/1988 | Tlaker et al. | |
| 5,009,554 A | 4/1991 | Kameyama et al. | |
| 5,061,128 A | 10/1991 | Jahr et al. | |
| 5,066,897 A | 11/1991 | Ueda et al. | |
| 5,345,390 A | 9/1994 | Greenip, Jr. et al. | |
| 5,368,539 A | 11/1994 | Mills et al. | |
| 5,517,746 A | 5/1996 | Cox et al. | |
| 5,562,372 A * | 10/1996 | Baima et al. | 409/51 |
| 6,099,217 A | 8/2000 | Wiegand et al. | |
| 6,174,271 B1 | 1/2001 | Kosmowski | |
| 6,285,098 B1 | 9/2001 | Nestler et al. | |
| 6,439,813 B1 | 8/2002 | Repossini | |
| 6,705,408 B2 | 3/2004 | Kim et al. | |
| 6,835,033 B2 | 12/2004 | Fioroni | |
| 7,097,399 B2 | 8/2006 | Winfough et al. | |
| 2007/0003387 A1 * | 1/2007 | Yonemaru | 409/43 |
| 2010/0290852 A1 | 11/2010 | Koch et al. | |
| 2012/0076598 A1 * | 3/2012 | Bender et al. | 409/55 |

FOREIGN PATENT DOCUMENTS

| | | |
|---|---|---|
| JP | 11-077431 A | 3/1999 |
| JP | 2002-127004 A | 5/2002 |
| JP | 2003-127025 A | 5/2003 |

* cited by examiner

HORIZONTAL GEAR SHAPING MACHINE WITH DUAL SHAPING HEADS

FIELD OF THE INVENTION

This invention generally relates to automated machine tooling and more particularly to automated cutting machinery in which a reciprocating spindle is linearly reciprocated to drive a cutting tool relative to a workpiece.

BACKGROUND OF THE INVENTION

Gear shaping is a cutting process wherein a gear of a desired tooth profile with cutting capability can generate the similar tooth profile in a workpiece, i.e. a "blank", mounted on a work table. Gear shaping can be used to generate a tooth profile on the outer periphery of a workpiece, or the inner periphery of the workpiece. Additionally, gear shaping is particularly advantageous when shaping gears having a shoulder, i.e. a secondary flange, below the inner or outer periphery containing the tooth profile and in close proximity thereto.

As it relates to the general state of the art, reference can be had to U.S. Pat. Nos. 3,628,359; 4,136,302; 4,254,690; 4,533,858; 4,542,638; 4,629,377; 4,784,538; 5,345,390; and 7,097,399, the entire disclosures of which are also hereby incorporated by reference in their entireties. As can be generally appreciated from the above, gear shaping is a cutting process wherein a spindle fixedly carrying the cutting gear linearly and vertically reciprocates across the inner or outer periphery of the workpiece to successively cut the desired tooth profile. The cutting gear and workpiece also rotate relative to one another during cutting in the same manner that the finished gear would mesh with its mating gear during operation.

As will be appreciated from the aforementioned references, there are several problems that arise with conventional gear shaping machines. As one example, the linear and vertical stroking is typically accomplished by a complex linkage also referred to as a stroke drive that extends between a static mounting location on the gear shaping machine and the moving spindle. As such, to change movement of the spindle with respect to stroke length, speed, and/or position, separate additional motors and axes of control are required throughout the stroke drive.

As another example, the vertical working direction of conventional gear shaping machines restricts shaping operations to a single spindle. Such a restriction can be disadvantageous when machining more complex gearing such as splines or the like which can have a plurality of different tooth profiles, each of which dependent upon the position of the other ones of the plurality of tooth profiles. When manufacturing such a construction, a single spindle vertical shaper can only do one profile at a time. To move on to a subsequent profile, tool change or other set-up operations can affect the accuracy of the relationship between the plurality of tooth profiles resulting in poor gear performance.

In view of the above, it is therefore desirable to have a gear shaping machine that overcomes the aforementioned problems with conventional designs.

BRIEF SUMMARY OF THE INVENTION

The present invention is directed toward a cutting machine that has several different inventive aspects that may be employed independently or in combination. Some aspects are summarized below while others may be developed in the remainder of the disclosure.

In one aspect, a gear shaping machine is provided. An embodiment of a gear shaping machine according to this aspect includes a base. A column is mounted to and movable relative to the base. A first gear shaping head is mounted to the column. A second gear shaping head is also mounted to the column. A linear actuation arrangement is operably mounted between the column and each of the first and second gear shaping heads to linearly move each of the first and second gear shaping heads independently of one another and relative to the base along a gear shaping axis.

In certain embodiments, each of the first and second gear shaping heads are slidably mounted to the column for translation relative to the column. The first and second gear shaping heads are slidably mounted for simultaneous translation relative to the column.

In certain embodiments, the column includes a pair of rails in an opposed spaced relation. The rails are positioned on either side of a channel formed in the column. Each of the first and second gear shaping heads are commonly mounted to the pair of rails and positioned within the channels such that the first and second gear shaping heads are slidably along the gear shaping axis.

In certain embodiments, the channel includes an upper and a lower surface extending away from a back surface. The linear actuation arrangement includes a first and a second plurality of magnets each respectively mounted on the upper and lower surfaces. The linear actuation arrangement further includes an upper and a lower linear motor provided with each of the first and second gear shaping heads. Each upper linear motor is aligned with the first plurality of magnets, and each lower linear motor is aligned with the second plurality of magnets.

In certain embodiments, the column is movable relative to the base along an infeed axis generally perpendicular to the gear shaping axis. In certain embodiments, the first gear shaping head is in an opposed spaced relationship with the second gear shaping head. A shaping region is defined between the opposed first and second gear shaping heads. Each of the first and second gear shaping heads is movable along the gear shaping axis independently of the other to increase or decrease the size of the shaping region.

In certain embodiments, a centering arm is mounted to the base. The centering arm is operable to axially support a work piece mounted between a work table and the centering arm. In certain embodiments, the gear shaping machine also includes a support arm positioned on the base between the centering arm and the work table. The support arm is operable to support a work piece extending from the work table.

In certain embodiments, the gear shaping machine further includes a controller in electronic communication with each of the linear actuation arrangement, rotary drives of the first and second gear shaping heads, and with the rotary drive of the work table to control to the relative movement thereof.

In another aspect, a gear shaping machine is provided. An embodiment of a gear shaping machine according to this aspect includes a based fixed to a horizontal support surface. A column is mounted to the base and moveable relative to the base. At least one gear shaping head is mounted to the column. The at least one gear shaping head is slidably mounted on the column for reciprocation about a horizontal gear shaping axis that is parallel to the horizontal support surface.

In certain embodiments, at least one gear shaping head does not reciprocate vertically toward and away from the base.

In certain embodiments, the gear shaping machine further includes a work table mounted to the base. The work table defines a horizontal work piece axis that is parallel to the gear shaping axis and parallel to the horizontal support surface. The work table is configured to receive a work piece such that the work piece axis passes through a center thereof. The work table is operable to rotate the work piece about the work piece axis. The column is movable relative to the base along an infeed axis that is generally perpendicular to the gear shaping axis and the work piece axis.

In certain embodiments, the gear shaping machine further includes a linear actuation arrangement mounted between the column and at least one gear shaping head. The linear actuation arrangement is operable to horizontally move the at least one gear shaping head relative to the column.

In certain embodiments, the at least one gear shaping head includes a first and a second gear shaping head slidably mounted in an opposed space relation for horizontal movement relative to the column and relative to one another.

In yet another aspect, a gear shaping head is provided. An embodiment of a gear shaping head according to this aspect includes a saddle. A spindle assembly is mounted to the saddle and movable relative to the saddle. A back-off mechanism is mounted between the saddle the spindle assembly for rotating the spindle assembly in a back-off direction relative to the saddle. At least one linear motor is mounted to the saddle and configured for moving the gear shaping head along a gear shaping axis.

In certain embodiments, the saddle has a top, back and pair of side walls surrounding a cavity. A portion of the spindle assembly is received in the cavity such that it can rotate in the back-off direction within the cavity.

In certain embodiments, the back-off mechanism includes a back-off actuation arrangement mounted to the top wall of the saddle. The back-off mechanism further includes an arm extending between the back-off actuation arrangement and the spindle assembly and along the back wall of the saddle. The arm is operable to rotate the spindle assembly in the back-off direction upon movement of the back-off actuation arrangement.

In certain embodiments, the spindle assembly is mounted to the saddle using a plurality of horizontal and vertical flexure plates. The arm has a first and a second end. The first end is connected to the back-off actuation arrangement using a flexure linkage. The second end is connected to the saddle using at least one vertical flexure plate and at least one horizontal flexure plate. The second end is also connected to the spindle assembly using an angled flexure plate.

In certain embodiments, the spindle assembly includes a integral rotary drive having a drive shaft. The spindle assembly further includes a coupler mechanically coupled between the drive shaft and a spindle of the spindle assembly. The spindle carries a cutting tool. The rotary drive is operable to index the orientation of the cutting tool relative to the spindle assembly. The integral rotary drive, coupler, and drive shaft provide a low back lash assembly.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, FIGS. 1-10 illustrate an exemplary embodiment of a gear shaping machine 20 which incorporates first and second gear shaping heads 22, 24 that are used to produce various gear profiles by reciprocating in a generally horizontal direction. By "horizontal" it is meant along an axis parallel to a support surface supporting the gear shaping machine 20 such as a floor, and unlike "vertical" gear shapers which reciprocate toward and away from the support surface or floor supporting such a machine.

Figure 1:
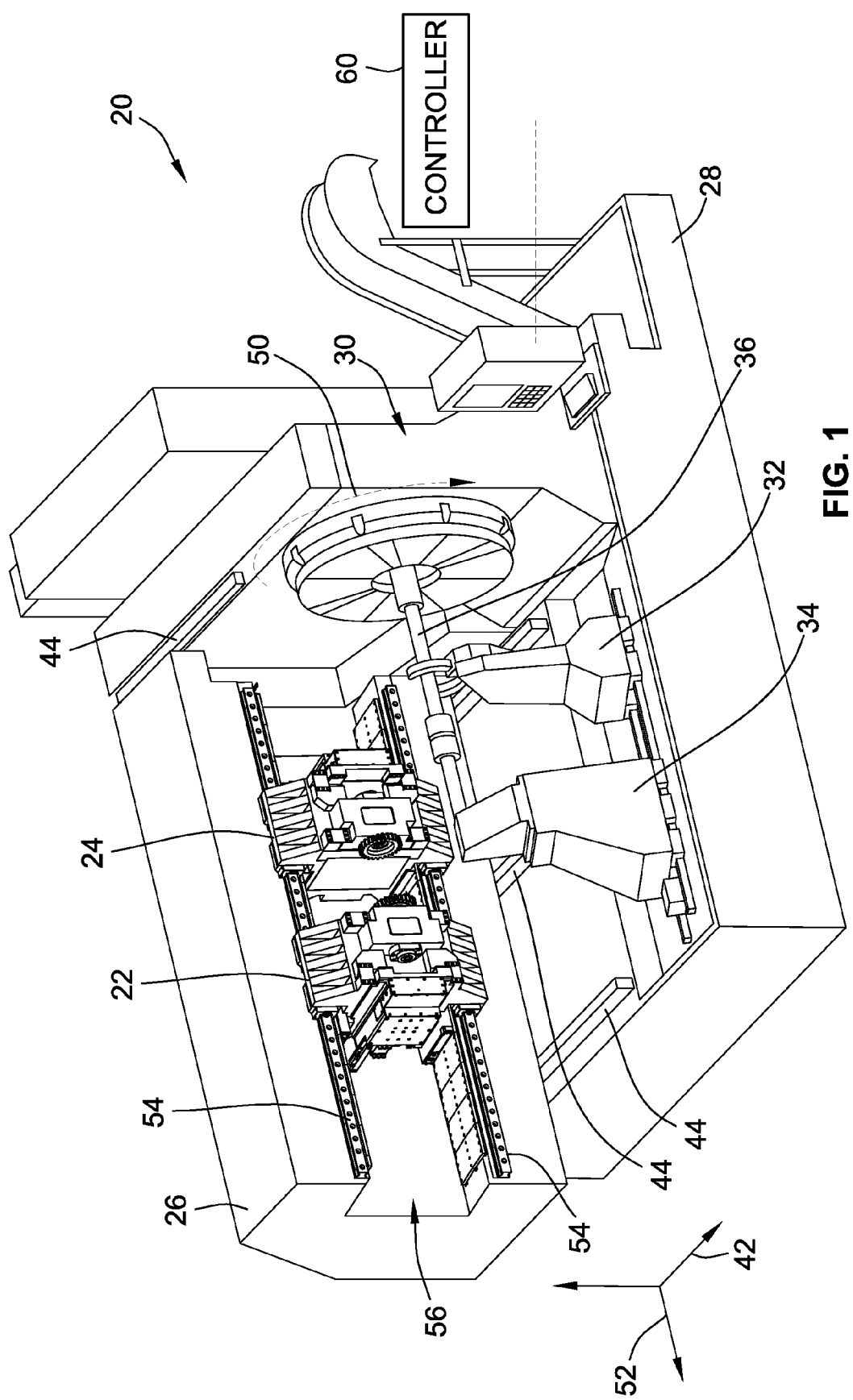
FIG. 1 is a perspective view of an embodiment of a gear shaping machine of the present invention that incorporates a pair of gear shaping heads.

With particular reference to FIG. 1, the gear shaping machine 20 includes first and second gear shaping heads 22, 24 slidably mounted to a movable column 26. The column 26 is slidably mounted to a base 28. A work table 30 is also mounted to the base, and extends upwardly away therefrom. The gear shaping heads 22, 24 are arranged in an opposed spaced relationship. The gear shaping heads 22, 24 can move in unison from left to right and vice versa in FIG. 1. A shaping region is thus interposed between the shaping heads 22, 24, and has a fixed length based upon the positioning of the shaping heads 22, 24 relative to one another. As such, while one shaping head 22 is performing a cutting stroke, the other shaping head 24 will be performing a return stroke and vice versa. Additionally, the shaping heads 22, 24 can be connected together such that the motive force provided by each shaping head 22, 24 is distributed to both shaping heads 22, 24.

In the alternative to moving in unison, the gear shaping heads 22, 24 can move towards and away from one another such that one shaping head 22 is moving from left to right, while the other shaping head 24 is moving from right to left. When the shaping heads 22, 24 are moving away from one another on a return stroke, the shaping region length will be larger than when the shaping heads 22, 24 are moving towards one another in a cutting stroke. Although illustrated as incorporating two gear shaping heads 22, 24, in other embodiments fewer or greater shaping heads may be utilized.

As shown, a work piece 36 is mounted to the work table 30. The work piece 36 is also supported by a first fixture arm 32

(also referred to as a support arm) and a second fixture arm 34 (also referred to as a centering arm). In the exemplary illustration of FIG. 1, the work piece 36 is generally illustrated as spline. However, it will be recognized that the gear shaping machine 20 can form other types of gears and is not limited to splines. Advantageously, and as will be described in greater detail below, the use of multiple gear shaping heads 22, 24 allows for the independent and simultaneous formation of different tooth profiles in a single setup.

The gear shaping heads 22, 24 are slideably mounted to the column 26 and moveable with the column 26 towards and away from the work piece 36 along an infeed axis 42. The column 26 is slideably mounted on rails 44 disposed about the base 28 and the work table 30. Each gear shaping head 22, 24 is moveable along a gear shaping axis 52 to produce a corresponding tooth profile in an outer periphery of the work piece 36. More specifically, each gear shaping head 22, 24 is slideably mounted to a pair of rails 54 in opposed spaced relation on either side of a channel 56 formed in the column 26. Also disposed within the channel 56 is the linear actuation arrangement formed between each of the gear shaping heads 22, 24 to produce the aforementioned reciprocation along the gear shaping axis 52.

As will be explained in greater detail below, each gear shaping head 22, 24 also incorporates a rotary drive therein to rotate or index a cutting tool 114 (see FIG. 4) of the gear shaping head 22, 24 to achieve helical or herringbone tooth profiles and the like. Similarly, the work table 36 also includes an integrated rotary drive (not shown) to index the work table in or opposite to rotational direction 50 shown at FIG. 1. Such functionality also permits the formation of helical or herringbone tooth profiles and the like.

Figure 2:
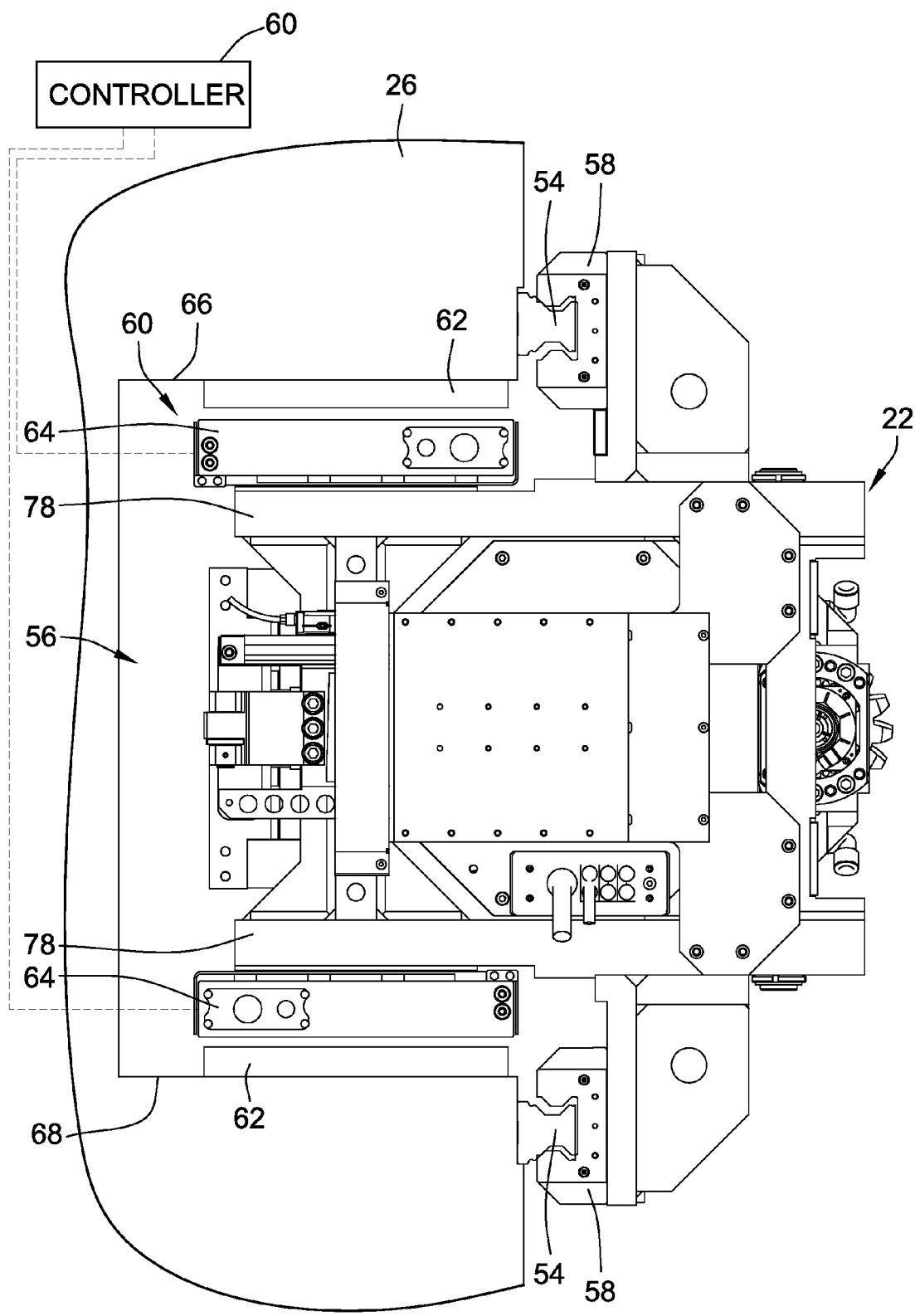
FIG. 2 is a side view of one of the gear shaping heads of FIG. 1 in a mounted configuration.

Turning now to FIG. 2, a side view of the left-most gear shaping head 22 from FIG. 1 is illustrated. For the purposes of brevity, the remainder of the description will reference only the left-most gear shaping head 22 shown in FIG. 1 when describing the various attributes of the gear shaping heads 22, 24. It will be recognized that these gear shaping heads 22, 24 are identical, and as such, the description of the left-most gear shaping head 22 applies equally well to the right-most gear shaping head 24 also shown at FIG. 1. As illustrated in FIG. 2, the gear shaping head 22 includes bearing blocks 58 which slideably receive the aforementioned rails 54. Disposed within the channel 56 is a plurality of magnets 62. More specifically, the magnets 62 are arranged in an opposed spaced relation on top and bottom walls 66, 68 of the channel 56.

A portion of the gear shaping head 22 extends into the channel 56 and between the magnets 62. A pair of linear motors 64 are arranged on opposing sidewalls 78 of the gear shaping head 22 and in proximity to the magnets 62. The magnets 62 and linear motor 64 thus form a linear actuation arrangement positioned or interposed between the column 26 and the gear shaping head 22, similar to the configuration of U.S. patent application Ser. No. 12/764,701, titled: "Cutting Machine for Gears, Splines, & Other Shapes" filed on Apr. 21, 2010, and assigned to the instant assignee, the teachings and disclosure of which are incorporated herein by reference thereto in their entirety. The linear motors 64 are electronically coupled to a controller 60 (see also FIG. 1) and are thus controlled thereby. The controller 60 is operable to provide a control signal to the linear motors 64 to reciprocate the gear shaping head 22 along the gear shaping axis 52 (see FIG. 1). The column 26 can also be provided with internal cooling (not shown) proximate the channel 56 to keep the same relatively cool during the aforementioned reciprocation of the gear shaping head 22.

Figure 3:
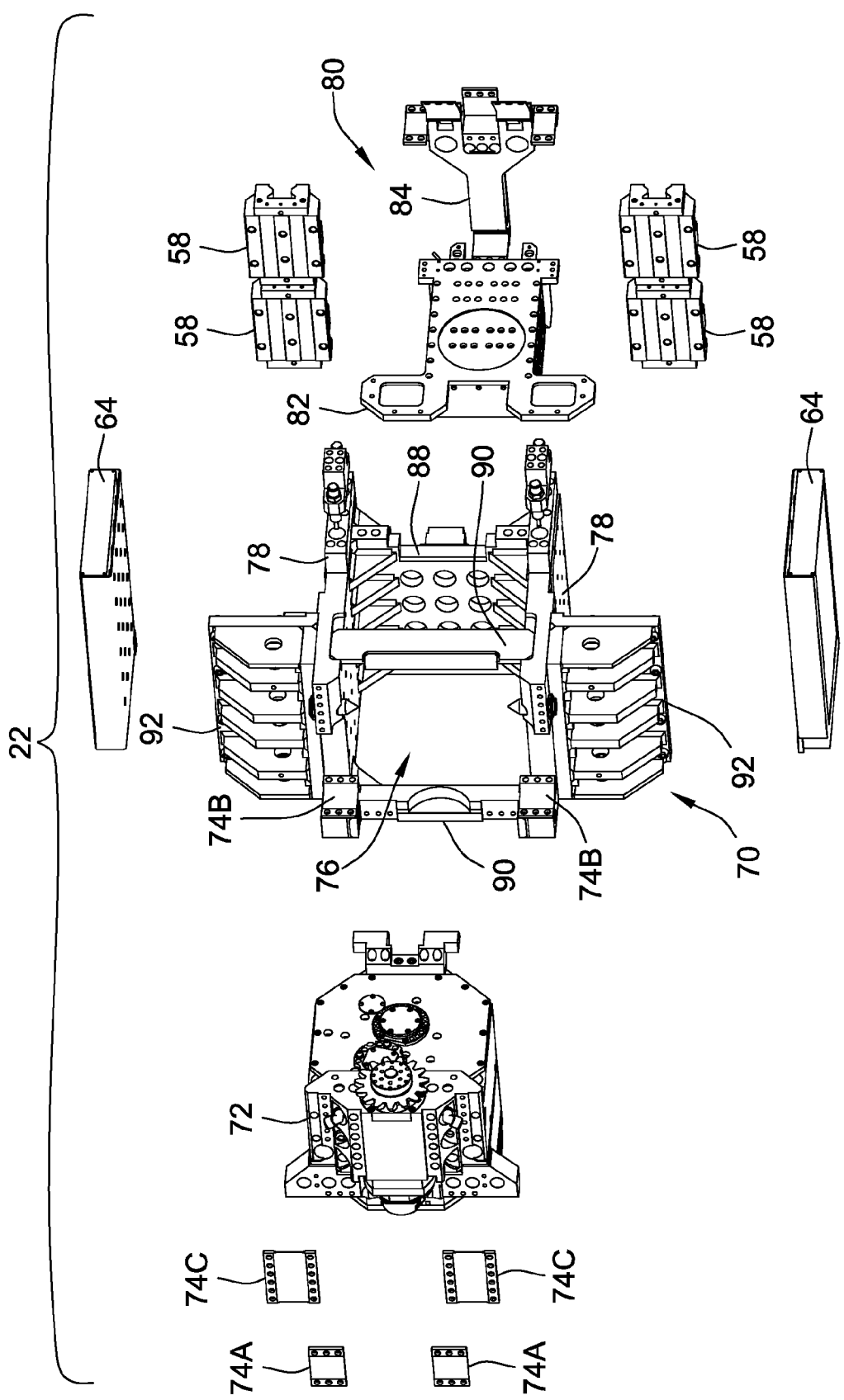
FIG. 3 is a perspective exploded view of one of the gear shaping heads of FIG. 1.

Turning now to FIG. 3, the particulars of the gear shaping head 22 will be described in greater detail. The gear shaping head 22 includes a base frame in the form of a saddle 70. A spindle assembly 72 is mounted within the saddle 70 and is operable to provide the aforementioned gear shaping functionality. The spindle assembly 72 is coupled to the saddle 70 by way of a plurality of flexure plates 74A, 74B, 74C.

Flexure plates 74A, 74B, 74C provide for oriented stiffness to the extent that they are relatively stiff in the direction of their width, but can deflect in the direction of their thickness. As a result, they can provide both a structural supporting function in one plane, and permit deflection in another to allow for relative motion of the components interconnected by the flexure plates. Indeed, flexure plates 74A, 74B together function as pivot point for the spindle assembly 72 relative to the saddle 70, as well as flexure plate 74C, all of which will deflect generally in the direction of their thicknesses to allow the spindle assembly to move slightly into and out of an opening 76 of the saddle 70. Each of flexure plates 74A, 74B, and 74C also functions as a lateral support, preventing spindle assembly 72 from sagging within the saddle 70, in other words deflecting downwardly in the orientation at FIG. 3.

That is, while the flexure plates 74A, 74B, 74C will permit some deflection generally in the direction of their thickness, they are relatively stiff in the direction of their width so as to hold the spindle assembly 72 laterally within the saddle 70. This operation is similar to the operation described at U.S. Pat. No. 7,097,399, titled "Cutting Machine for Gear Shaping or the Like" assigned to the instant assignee, the teachings and disclosure of which are incorporated by reference thereto in their entirety.

The spindle assembly 72 is positioned within the opening 76 formed between opposing sidewalls 78, a back wall 88, and crossbars 90 of the saddle 70. As such, the opening 76 is generally cube-shaped, and provides clearance for the spindle assembly 72 therein.

As described above, linear motors 60 mount to the exterior of sidewalls 78. Also extending from the exterior of sidewalls 78 are wing structures 92 in opposed spaced relation. The aforementioned bearing blocks 58 mount to the wing structures 92. As illustrated, the wing structures 92 include a plurality of support ribs which support the wing structures 92, as well as provide a cooling mechanism for the heat generated during the reciprocating cycling of the gear shaping head 22.

Figure 4:
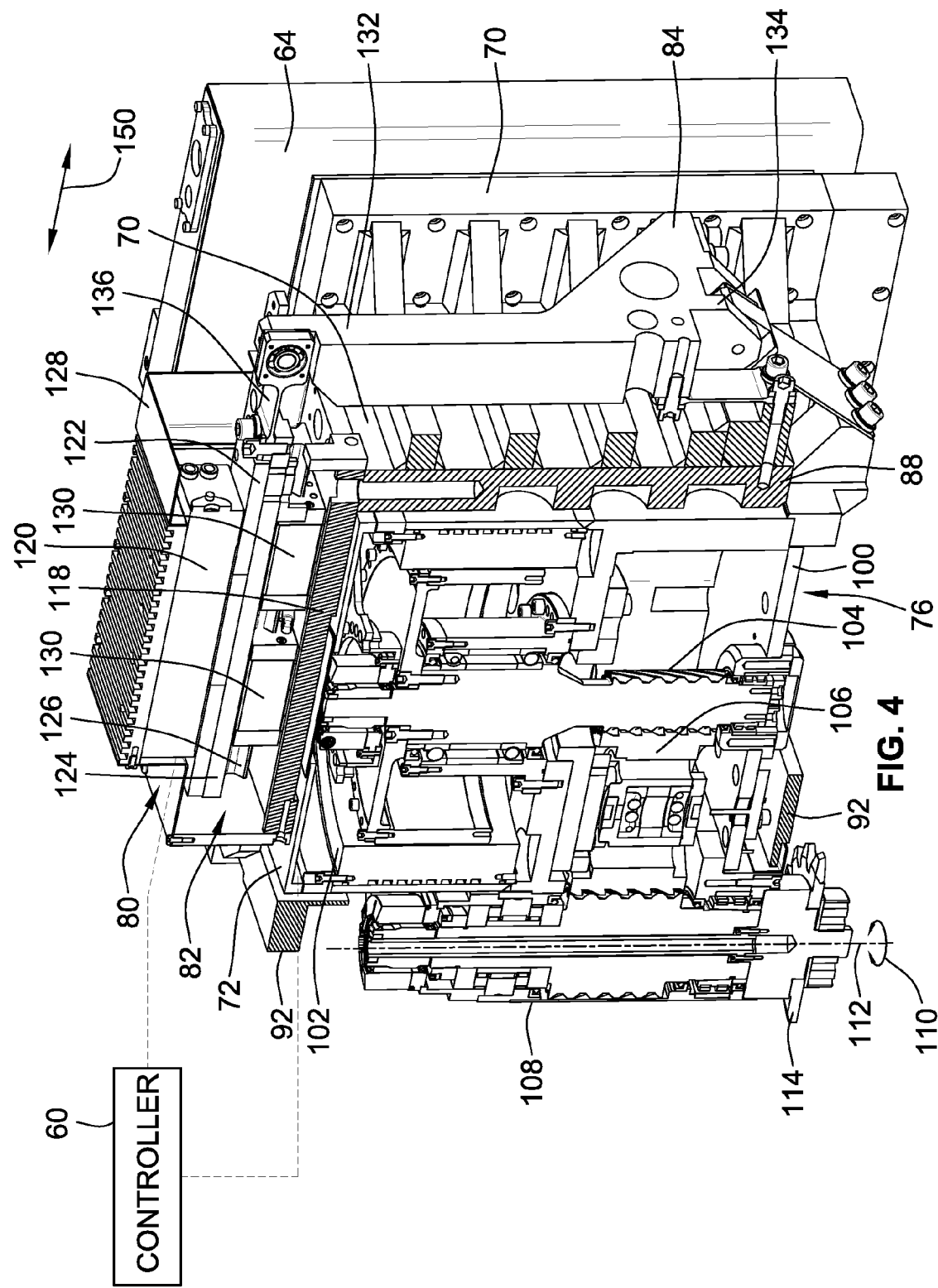
FIG. 4 is a perspective cross section of one of the gear shaping heads of FIG. 1.

Turning now to FIG. 4, the spindle assembly 72 includes a housing 100 that contains a rotary drive 102 of the spindle assembly 72. The rotary drive 102 is in electronic communication with the controller 60 (see also FIG. 1) and thus is controlled thereby.

The rotary drive 102 includes a driveshaft 104. The driveshaft 104 is mechanically coupled to a coupling gear 106. The coupling gear 106 is in turn mechanically coupled to a spindle 108 of the spindle assembly 72. As a result, rotation of the rotary drive 72 and the attendant rotation in the driveshaft 104 produces a rotation in the coupling gear 106 which in turn produces a rotation in the spindle 108. Put differently, the torque provided by the rotary drive 102 is transferred through the driveshaft 104 thereof to the spindle 108 by way of the intermediate connection of the coupling gear 106. Such rotation is operable to index the cutting tool 114 in direction 110 about a spindle axis, with the cutting tool 114 connected at an end of the spindle 108 as shown. This system of driving the spindle 108 is provided with adjustment to provide near zero lost motion. Put differently, the controller 60 is operable to dynamically adjust the rotation and stroke length of the spindle 108 to preserve efficient operation.

As discussed previously, such indexing is utilized to create non-straight tooth profiles such as helical or herringbone tooth profiles and the like. More particularly, as the gear shaping head 22 is on its cutting stroke along the gear shaping axis 52 (see FIG. 1), the rotary drive 102 is operable to provide rotation to the cutting tool 114 during the cutting stroke via the aforementioned mechanical connection between the spindle 108 and the rotary drive 102.

The gear shaping head 22 also includes a back-off mechanism 80. The back-off mechanism 80 is bi-directional in that it is responsible for moving the spindle assembly 72 relative to the saddle 70 both toward and away from a work piece 36 (see FIG. 1), e.g. moving the spindle assembly 72 outwardly and inwardly relative to the opening 76. The back-off mechanism 80 includes a back-off actuation arrangement 82 and a back-off arm 84. The back-off actuation arrangement 82 mounts to the saddle 70. The back-off arm 84 extends from the back-off actuation arrangement 82 around an exterior of the back wall 88. A terminal end of the back-off arm 84 is connected to the saddle 70 as well as the spindle assembly 72 by way of flexure plates 138, 140, 142 which offer oriented stiffness as described above. The back-off mechanism 80 has a large mechanical advantage as a result of the back-off arm 84. Such a large mechanical advantage enables precise motion to be programmed for the back-off operation as described below, as well as motion for size, taper, contour, and crowning during cutting the entire length of the work piece 36 (see FIG. 1), or a portion thereof.

The back-off mechanism 80 is operable to move the spindle assembly 72 away (i.e. into the opening 76 of the saddle 70) from the work piece 36 (see FIG. 1) on the return stroke of the gear shaping head's 22 reciprocating cycle. Such operation avoids a condition known as rub wherein the cutting tool of the gear shaping head can unintentionally perform a cutting operation on a work piece during its return stroke. To avoid such a condition, the spindle assembly 72 is slightly backed away from the work piece 36 (see FIG. 1) on its return stroke as described in greater detail below.

The back-off mechanism 80 is also operable to move the spindle assembly 72 towards (i.e. out of the opening 76 of the saddle 70) the work piece 36 (see FIG. 1) on the cutting stroke of the gear shaping head's 22 reciprocating cycle to precisely control the depth of cut along the infeed axis. Such operation permits the manufacture of more complex gear profile characteristics such as taper, crown, and contour by manipulating or changing the depth of cut, mid-stroke.

Still referring to FIG. 4, the back-off mechanism 80 will now be described in greater detail. The back-off mechanism 80 includes a base 118. The remainder of the back-off actuation arrangement 82 is mounted to the base 118. As shown, the base 118 is mounted to a top portion of the saddle 70.

The back-off actuation arrangement 82 includes a linear motor 120 within a housing 128 thereof. Positioned adjacent to the linear motor 120 is a plurality of magnets 122 fixably mounted to a mounting plate 124. A rail 126 is also mounted to the mounting plate 124. The rail 126 is slideably received within a pair of bearing blocks 130 fixedly mounted to the base 118.

The linear motor 120 of the back-off actuation arrangement 82 is electronically coupled to the controller 60 (see also FIG. 1). As such, a control signal supplied to the linear motor 120 is operable to act upon the magnets 122 to provide linear translation of the mounting plate 124, as well as the magnets 122 and the rail 126 relative to the bearing blocks 130. Such linear movement of the mounting plate 124 also produces a movement of the back-off arm 84 to move the spindle assembly 72 relative to the saddle 70. Although only a single rail 26 and a pair of bearing blocks 130 are shown in the cross-section of FIG. 4, the back-off actuation arrangement 82 can incorporate two rails 126, and a total of four bearing blocks 130. For purposes of brevity, only a single rail 126 and pair of corresponding bearing blocks 130 are illustrated in the cross-section of FIG. 4.

Figure 5:
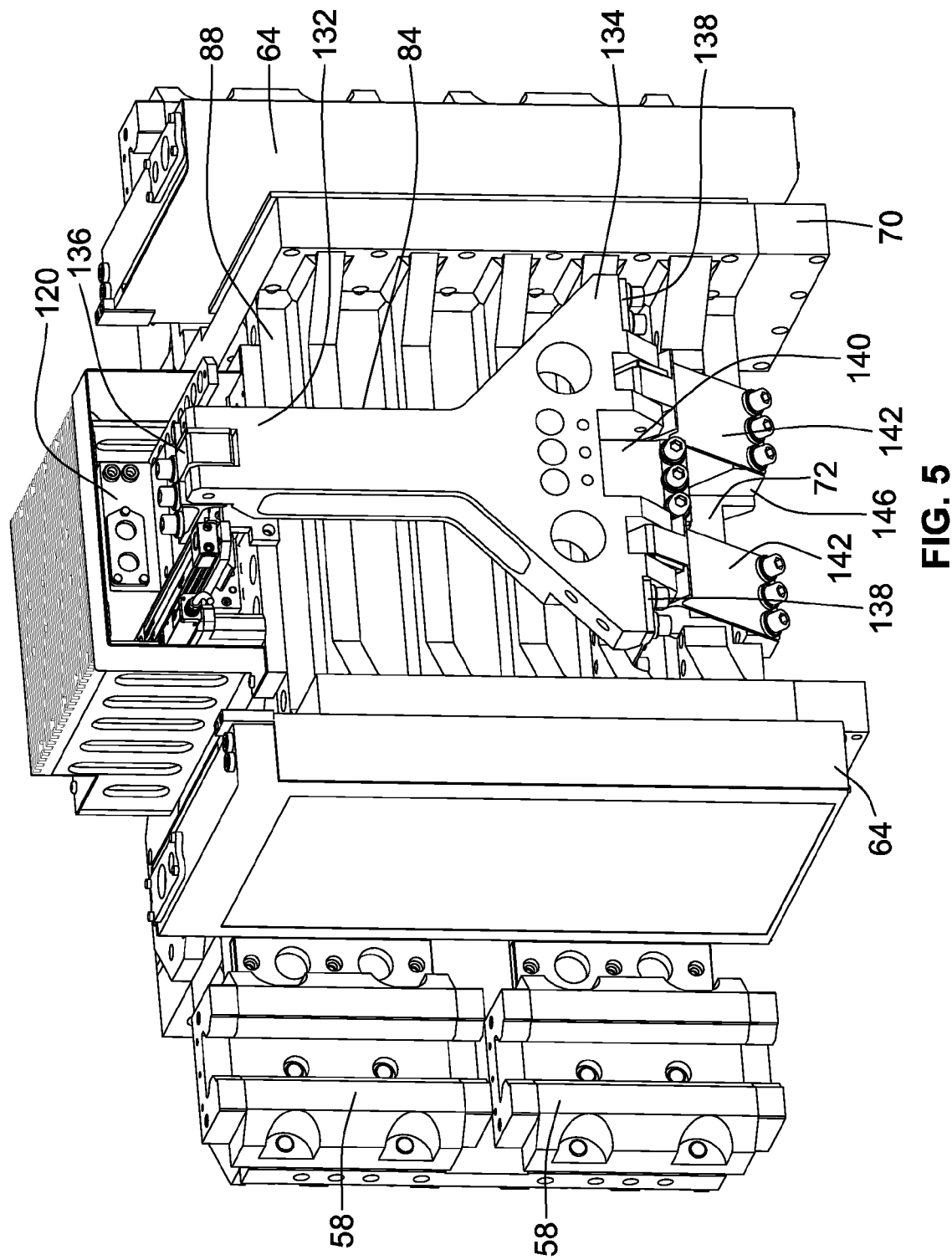
FIG. 5 is a rear perspective view of one of the gear shaping heads of FIG. 1.

The back-off arm 84 includes a first end 132 and a second end 134. As illustrated at FIG. 4, the first end 132 is coupled to the mounting plate 124 by a way of a linkage flexure 136. With reference no to FIG. 5, the second end 134 is connected to the exterior of the back wall 88 of the saddle 70 by horizontal flexure plates 138 and a vertical flexure plate 140. The second end 134 is also connected to the spindle assembly 72 by way of angled flexure plates 142. As a result, the back-off arm 84 is connected at its second end 134 to both the saddle 70 and the spindle assembly 72. These flexure plates 138, 140, 142 provide the same oriented stiffness advantages described above.

Figure 6:
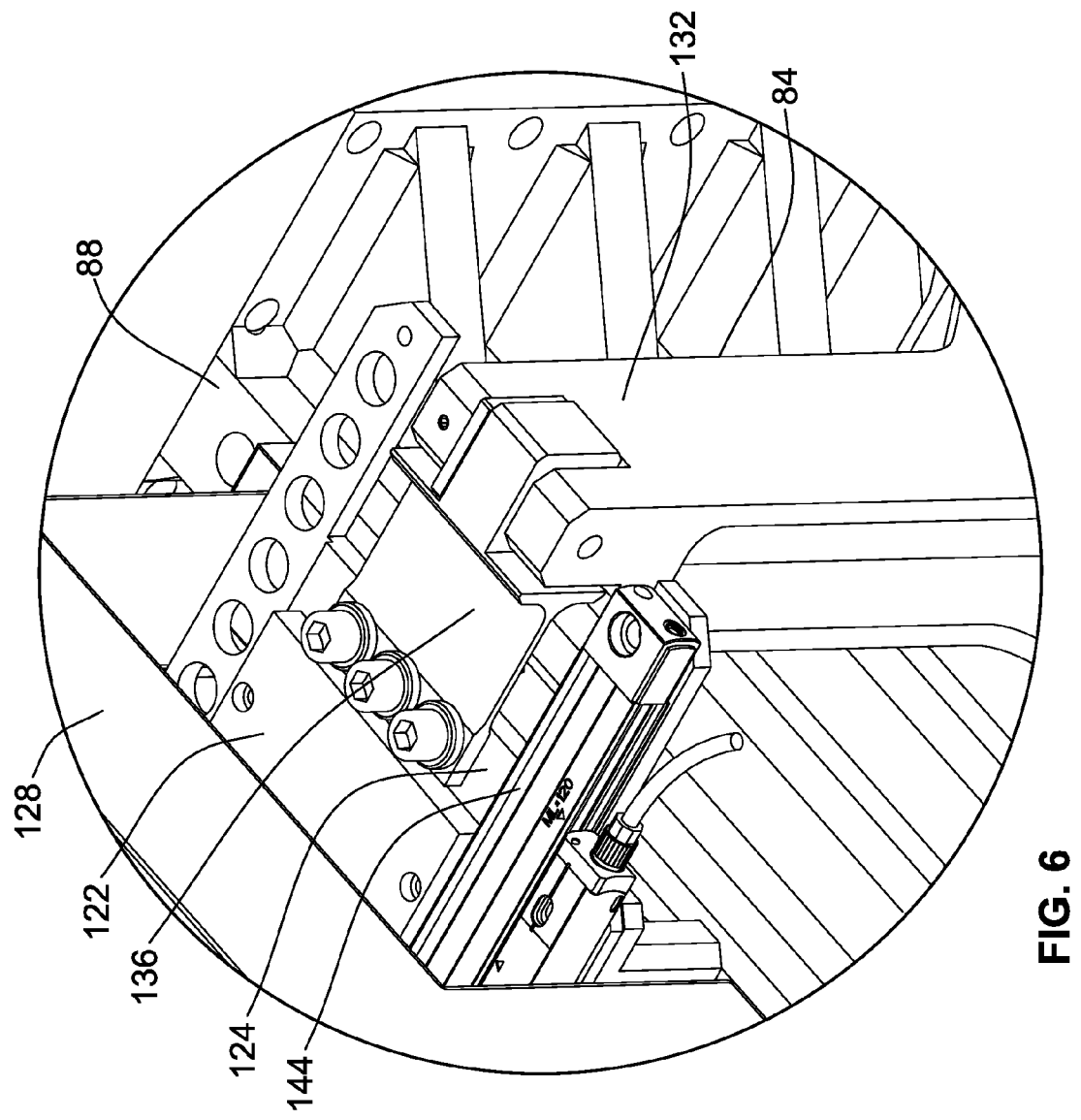
FIG. 6 is a partial top perspective view of a top portion of a back-off mechanism of one of the gear shaping heads of FIG. 1.

Turning now to FIG. 6, the linkage flexure 136 connecting the first end of 132 is generally a thin rigid plate offering oriented stiffness as described above and is hingedly connected at one end to the first end 132 of the back-off arm 84. The linkage flexure 136 is fixedly connected to the mounting plate 124 at an opposite end. As the linear motor 120 (see FIG. 4) causes the magnets 122 and mounting plate 124 to move along direction 150, the first end 132 is pulled inwardly towards or away from the back wall 88 of the saddle 70. A linear scale 144 is also provided to provide position information of the back-off actuation arrangement 82 to the controller 60 (see FIG. 1). Such information is used to provide feedback control of the position of the back-off actuation arrangement 82.

FIGS. 7-10 schematically illustrate the back-off operation provided by the back-off mechanism 80. These views illustrate the motion of the back-off mechanism 80, spindle assembly 72, and flexure plates 74A, 74B, 74C, 138, 140, 142 when the spindle assembly 72 moves into the opening 76 and away from a workpiece 36 (see FIG. 1). It will be recognized that the relative motion of these components is reversed when the back-off mechanism 80 drives the spindle assembly 72 out of the opening 76 of the saddle to manipulate the depth of cut.

Figure 7:
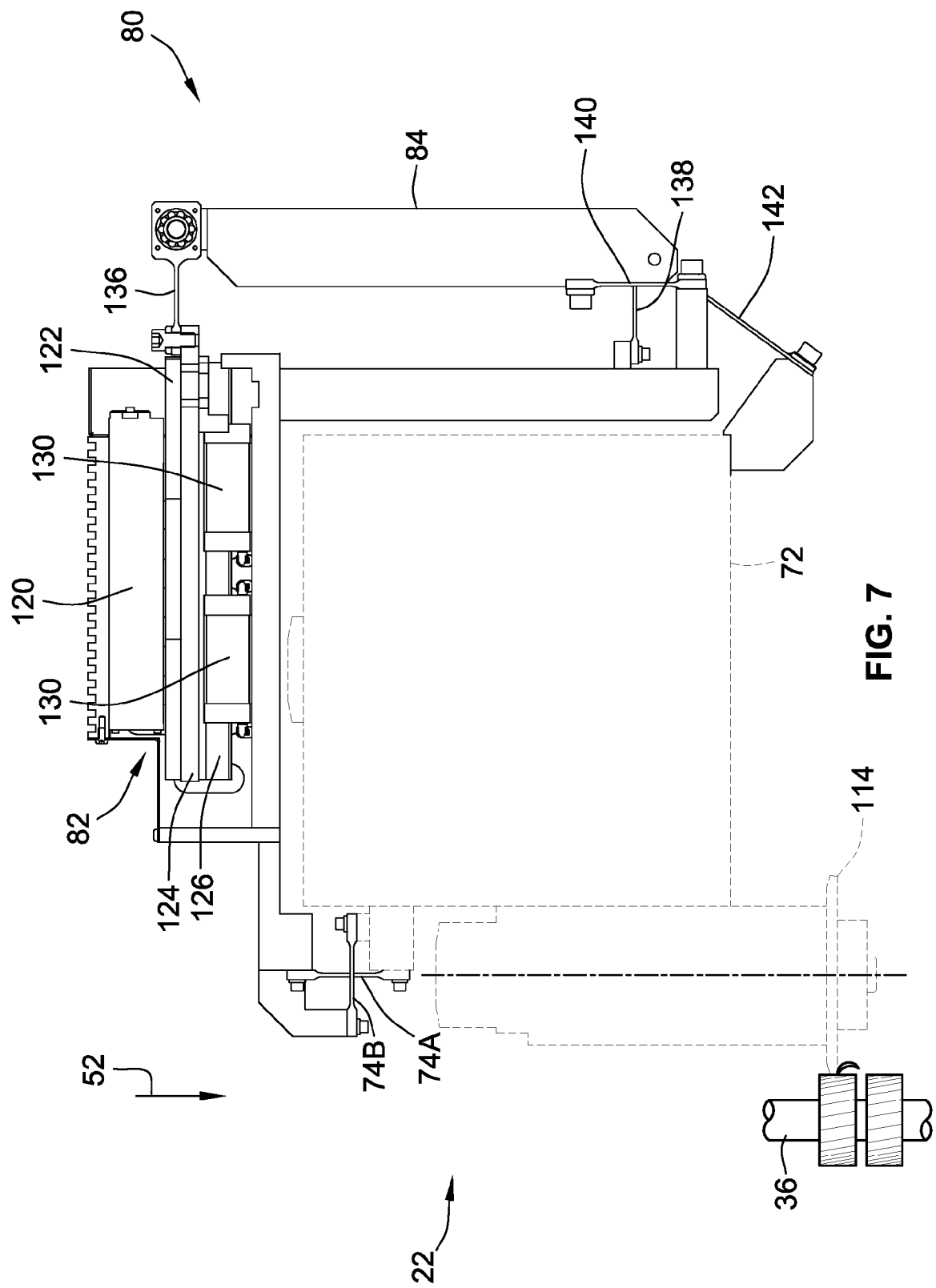
FIG. 7 is a partial side view of the connection of the back off mechanism of FIG. 6 with a spindle assembly and saddle of one of the gear shaping heads of FIG. 1 using flexure plates.

With particular reference to FIG. 7, the gear shaping head 22 is illustrated in the cutting stroke. As such, the tool 114 is in contact with the outer periphery of the work piece 36. As the gear shaping head 22 moves along the gear shaping axis 52, material is removed from the outer periphery of the work piece 36 by way of the cutting tool 114.

Figure 8:
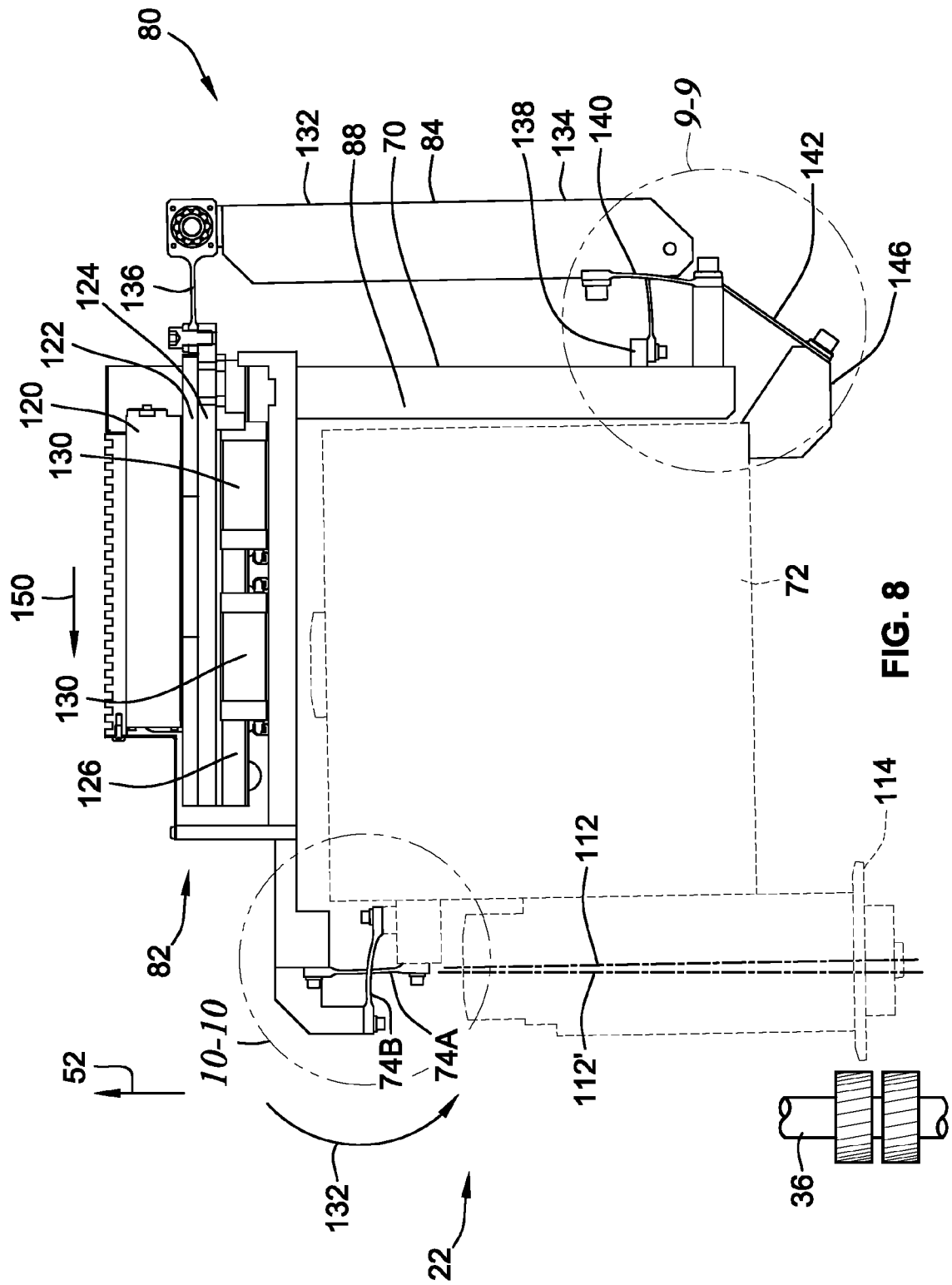
FIG. 8 is a side view of the movement of the back off mechanism of FIG. 6 in an exaggerated position.

However, and with reference now to FIG. 8, the back-off mechanism 80 is operable to pivot the spindle assembly 72 away from the work piece 36 such that the cutting tool 114 will not interfere with the work piece 36 in the return stroke as the gear shaping head 22 moves along the gear shaping axis 52 in the direction shown. To effectuate this operation, the linear motor 120 has advanced the magnets 122, mounting plate 124, and rail 126 forward along direction 150. In doing so, the first end 132 of the back-off arm 84 is pulled towards the back wall 88 of the saddle 70.

However, the second end 134 of the back-off arm 84 is connected to the saddle 70 via flexure plates 138, 140 which together form a pivot such that the aforementioned movement of the first end 132 of the back-off arm causes the second end 134 to pivot at the intersection of the flexure plates 138, 140 as shown. Such movement also causes the second end 134 to pull the angled flexure plates 142 in the direction illustrated.

The angled flexure plates 142 are connected to a back-off block 146 that is bolted to the spindle assembly 72. As a result, the aforementioned movement of the angled flexure plates 142 also moves the back-off block 146 as well as the spindle assembly 72 such that the spindle assembly generally rotates or pivots in direction 132 about the intersection of flexure plates 74A, 74B as illustrated. This rotation causes the spindle axis 112 to assume an angled orientation relative to spindle axis 112' which represents the position of the spindle axis 112 during the cutting stroke.

As can best be seen at FIG. 8, such movement of the spindle assembly 72 causes the flexure plates 74A, 74B which connect the spindle assembly 72 to undergo a similar deflection to that of flexure plates 138, 140 as shown. Although not illustrated, flexure plates 74C will also deflect to permit movement of the spindle assembly 72 relative to the saddle as described above. In all cases, the term "deflect" as used herein means that the flexure plates 74A, 74B, 74C, 138, 140, 142 momentarily bend within their elastic range to allow for the aforementioned movement of the spindle assembly 72 relative to the saddle, and will return to their otherwise straight configuration.

Figure 9:
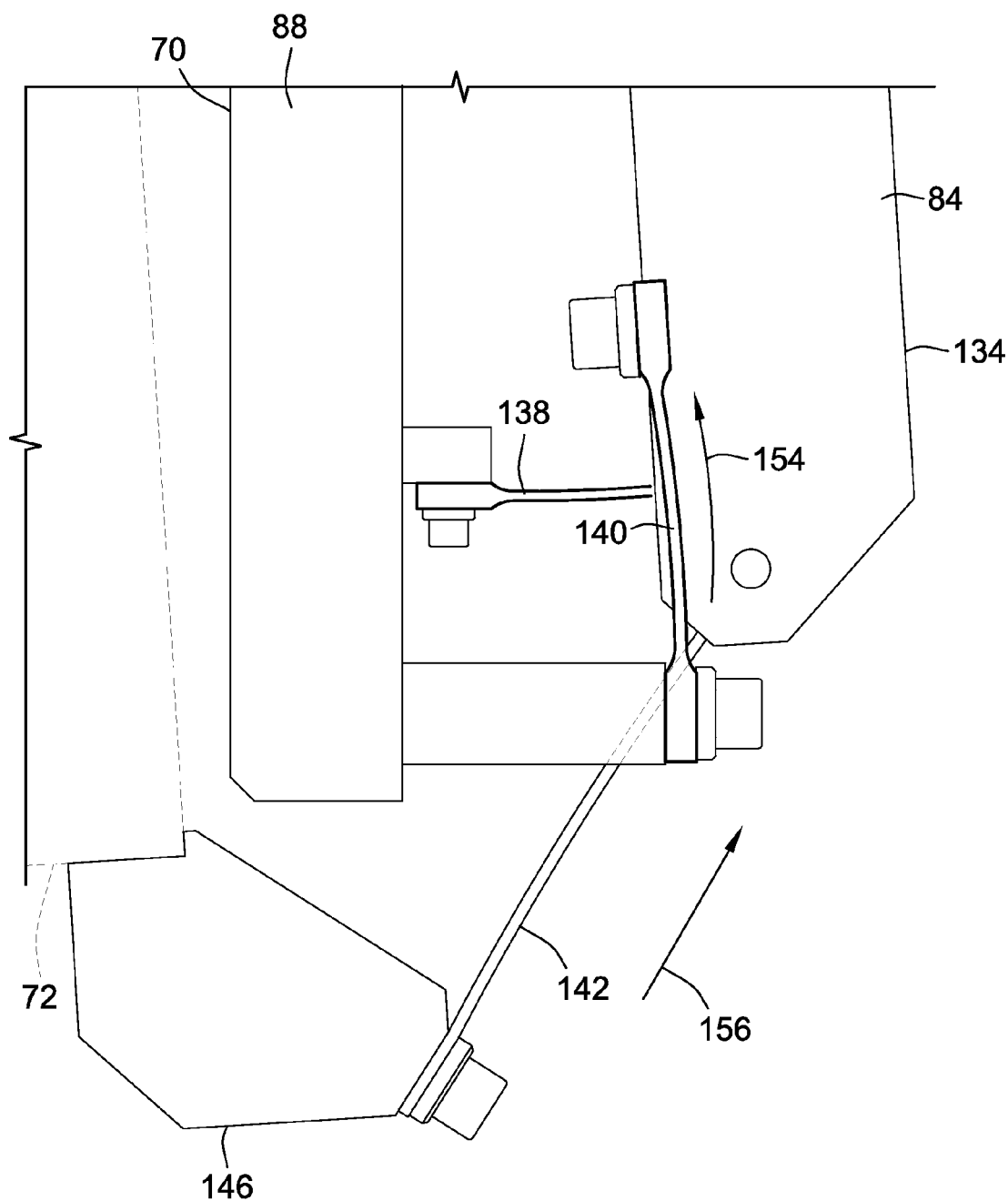
FIGS. 9 and 10 are partial side views of the flexures of FIG. 7 at the orientation of FIG. 8.

With reference now to FIG. 9, the deflection of the horizontal flexure plate 138, vertical flexure plate 140 and movement of the angled flexure late 142 is illustrated in greater detail. During the back-off movement, the second end 134 pivots about the pivot point defined by the intersection of the horizontal flexure plate 138 and vertical flexure plate 140 in direction 154 as illustrated. This causes the horizontal flexure plate 138 to bow upwardly and the vertical flexure plate 140 to bow outwardly to the right as shown. This rotation of the second end 134 in direction 154 also pulls the angled flexure plate 142 in direction 156 as illustrated.

This movement of the angled flexure plate 142 results in a corresponding movement of the back-off block 146 to pull the spindle assembly 72 into the orientation illustrated at FIG. 8. As a result, the cutting tool 114 is moved away from the outer periphery of the work piece 36 to allow the cutting tool 114 to return for the subsequent cutting stroke without interfering with the work piece during the return stroke.

Figure 10:
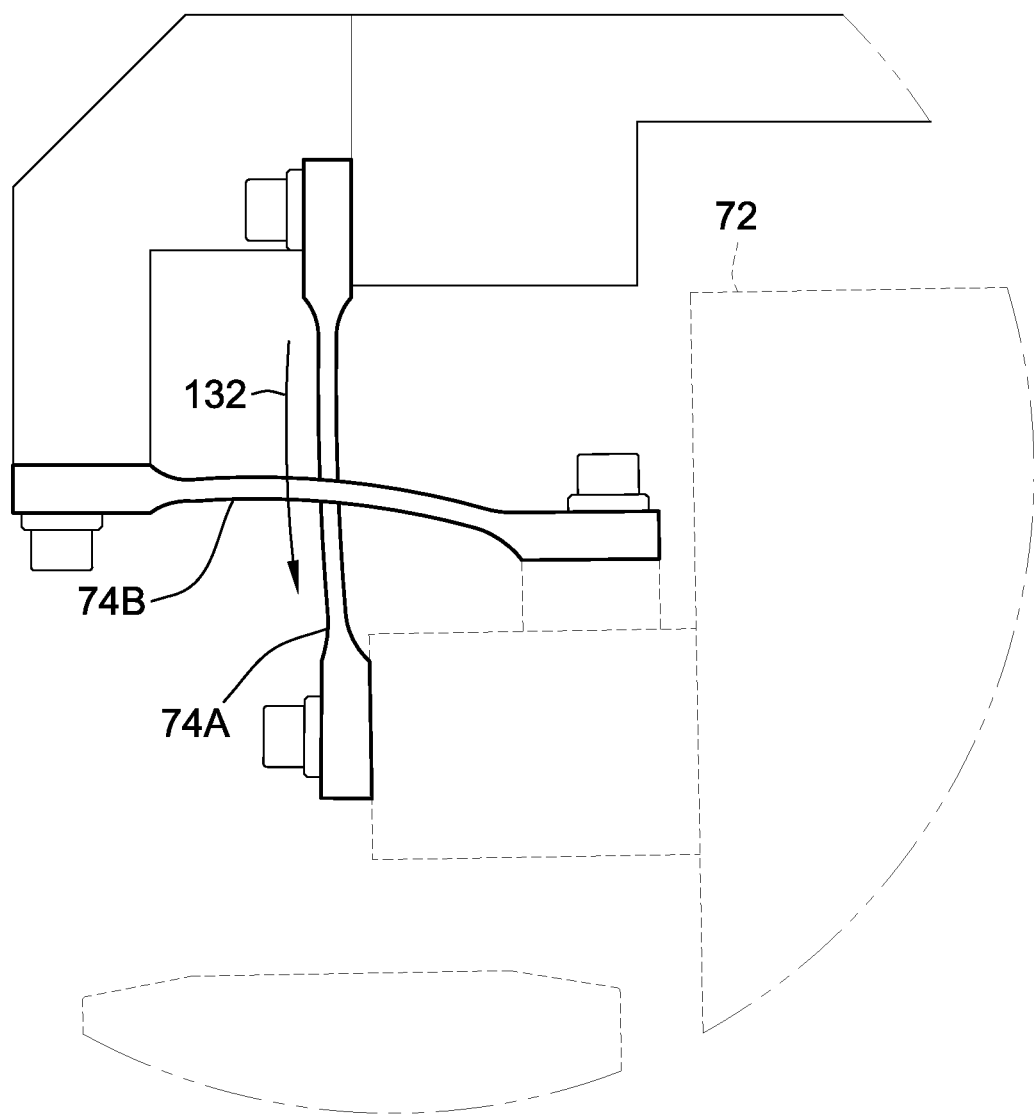

FIG. 10 illustrates the deflection of the of flexure plates 74A, 74B. During the back-off movement, the spindle assembly 72 pivots about the pivot point defined by the intersection of flexure plates 74A, 74B in direction 132. This causes flexure plate 74A do bow outwardly to the left, and flexure plate 74B to bow downwardly as illustrated. As discussed above, the deflections of the flexure plates 74A, 74B, 74C, 138, 140, 142 described above are reversed when the back-off mechanism 80 pivots the spindle assembly 72 out of the opening 76 of the saddle 70 and into engagement with the workpiece 36 (see FIG. 1) to manipulate cutting depth.

The above described operation of the back-off mechanism 80 is independent for each gear shaping head 22, 24. As such, the gear shaping heads 22, 24 can move independently along the infeed axis 42, with each gear shaping head 22, 24 capable of producing a different depth of cut than the other, despite the fact that both gear shaping heads 22, 24 are positioned by the column 26 (see FIG. 1) at a constant distance relative to the workpiece 36.

Those skilled in the art will recognize that the deformations of the flexure plates 74A, 74B, 74C, 138, 140, 142 shown across FIGS. 7-10 are exaggerated for illustrative purposes. In operation, such movement of these plates can be on the order of thousandths of an inch, and thus the particular deflections shown are for exemplary purposes only.

Figure 11:
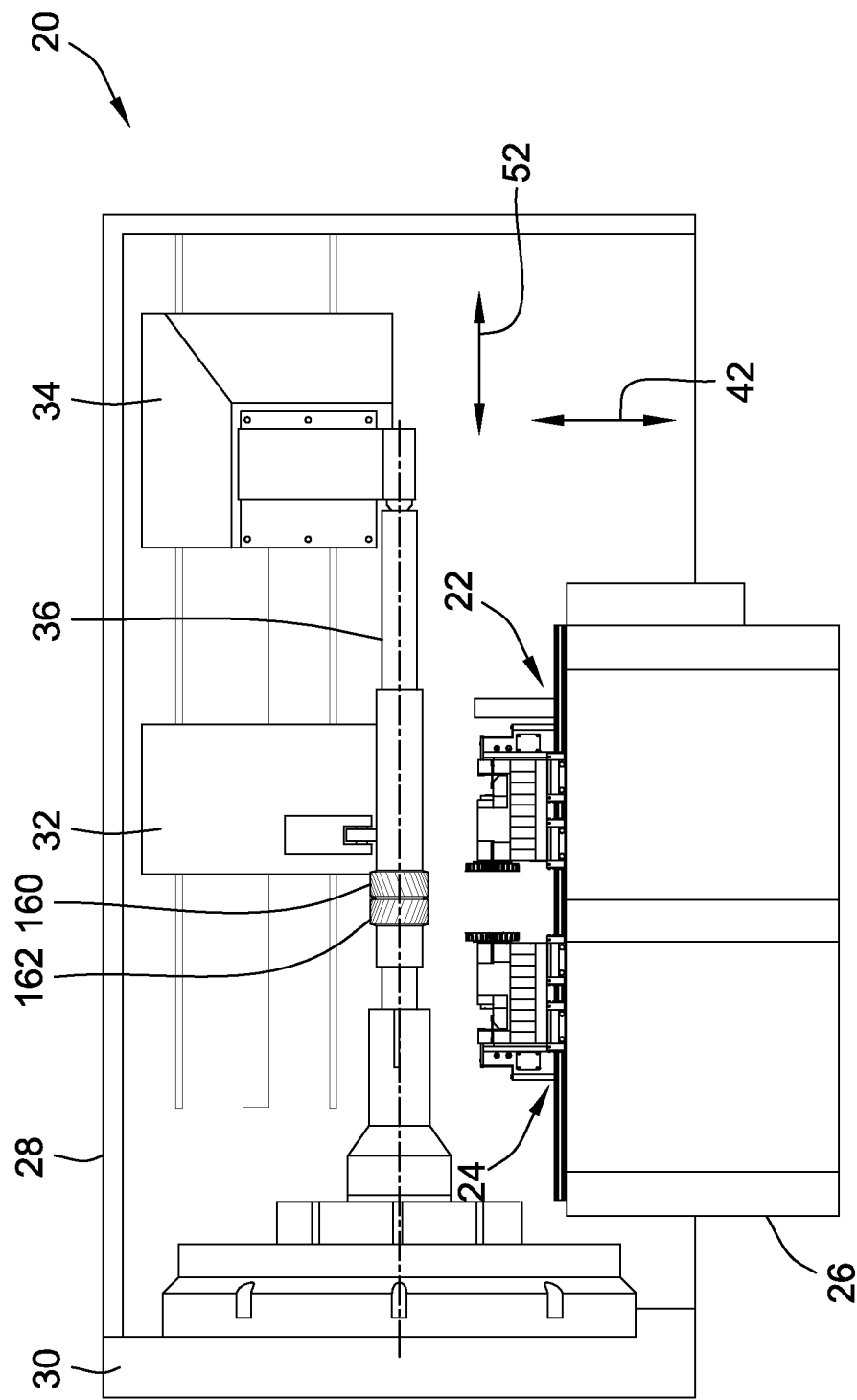
FIG. 11 is a top view of the gear shaping machine of FIG. 1, with the gear shaping heads in proximity to a work piece.

Turning now to FIG. 11, a top view of the gear shaping machine 20 is illustrated. In this view, the work piece 36 is illustrated having first and second tooth profiles 160, 162 which are not the same. One gear shaping head 22 is used to make on tooth profile 160, while the other gear shaping head 24 is used to made the other tooth profile 162. Advantageously, both profiles can be made in a single fixturing operation and thus a greater accuracy in the relationship between the first and second tooth profiles 160, 162 is achieved.

The gear shaping heads 22, 24 can function simultaneously or one at a time to manufacture the first and second tooth profiles 160, 162. It will be recognized that the illustrated work piece 36 includes only two distinct tooth profiles 160, 162 that are directly adjacent to one another. However, in other configurations, the work piece 36 may include greater or fewer than two tooth profiles. In instances where multiple tooth profiles are to be manufactured by the gear shaping heads 22, 24 these tooth profiles may be spaced apart from one another or located adjacent to one another as illustrated at FIG. 10.

In all cases, the gear shaping machine 20 overcomes existing problems in the art by providing a gear shaping machine 20 which fabricates gears by shaping the same along a horizontal gear shaping axis. Further, the gear shaping machine 20 overcomes existing problems in the art by incorporating multiple shaping heads, as opposed to a single shaping head. Such an improvement reduces the time to fabricate complex gear profiles otherwise required in single head machines. Further, as discussed above, a greater accuracy is achieved because such multiple profiles can be manufactured in a single set up.

What is claimed is:

1. A gear shaping machine, comprising:
   a base;
   a column mounted to and movable relative to the base;
   a first gear shaping head mounted to the column;
   a second gear shaping head mounted to the column; and
   a linear actuation arrangement operably mounted between the column and each of the first and second gear shaping heads to linearly move each of the first and second gear shaping heads independently of one another and relative to the base along a gear shaping axis;
   wherein each of the first and second gear shaping heads are slidably mounted to the column for translation relative to the column, the first and second gear shaping heads slidably mounted for simultaneous translation relative to the column;
   wherein the column includes a pair of rails in an opposed spaced relationship, the pair of rails positioned on either side of a channel formed in the column, wherein each of the first and second gear shaping heads are commonly mounted to the pair of rails and positioned within the channel such that the first and second gear shaping heads are slidable along the gear shaping axis; and
   wherein the channel includes an upper and a lower surface extending away from a back surface, and wherein the linear actuation arrangement includes a first and a second plurality of magnets each respectively mounted on the upper and lower surfaces, and wherein the linear actuation arrangement further comprises an upper and a lower linear motor provided with each of the first and second gear shaping heads, each upper linear motor aligned with the first plurality of magnets, and each lower linear motor aligned with the second plurality of magnets.

2. The gear shaping machine of claim 1, wherein the column is movable relative to the base along an infeed axis generally perpendicular to the gear shaping axis.

3. The gear shaping machine of claim 1, wherein the first gear shaping head is in an opposed spaced relationship with the second gear shaping head.

4. The gear shaping machine of claim 3, wherein a shaping region is defined between the opposed first and second gear shaping heads, and wherein each of the first and second gear shaping heads is movable along the gear shaping axis independently of the other to increase, decrease, or maintain the size of the shaping region.

5. The gear shaping machine of claim 3, further comprising a centering arm and a work table mounted to the base, the centering arm operable to axially support a workpiece between the work table and the centering arm.

6. The gear shaping machine of claim 5, further comprising a support arm positioned on the base between the centering arm and the work table, the support arm operable to support a work piece extending from the work table.

7. A gear shaping machine, comprising:
a base fixed to a horizontal support surface;
a column mounted to the base and movable relative to the base, the column including a channel;
at least one gear shaping head mounted to the column; and
wherein the at least one gear shaping head is slidably mounted on the column for reciprocation about a horizontal gear shaping axis that is parallel to the horizontal support surface;
further comprising a linear actuation arrangement mounted between the column and the at least one gear shaping head, the linear actuation arrangement operable to horizontally move the at least one gear shaping head relative to the column;
wherein the linear actuation arrangement includes a first and a second plurality of magnets each respectively mounted on upper and lower surfaces of the channel, and wherein the linear actuation arrangement further comprises a first upper linear motor and a first lower linear motor provided with the at least one gear shaping head, the first upper linear motor aligned with the first plurality of magnets, and the first lower linear motor aligned with the second plurality of magnets.

8. The gear shaping machine of claim 7, wherein the at least one gear shaping head does not reciprocate vertically toward and away from the base.

9. The gear shaping machine of claim 8, further comprising a work table mounted to the base, the work table defining a horizontal work piece axis that is parallel to the gear shaping axis and parallel to the horizontal support surface.

10. The gear shaping machine of claim 9, wherein the work table is configured to receive a work piece such that the work piece axis passes through a center thereof, the work table operable to rotate the work piece about the work piece axis, and wherein the column is movable relative to the base along an infeed axis that is generally perpendicular to the gear shaping axis and the work piece axis.

11. The gear shaping machine of claim 7, wherein the at least one gear shaping head includes a first and a second gear shaping head slidably mounted in an opposed spaced relation for horizontal movement relative to the column and relative to one another.

* * * * *